United States Patent [19]

O'Brien et al.

[11] Patent Number: 4,807,711
[45] Date of Patent: Feb. 28, 1989

[54] WEIGHING HOPPERS

[75] Inventors: Kennedy M. O'Brien, Great Barr; Keith E. Dunton, Rugely; Peter E. Newley, Leigh Woods; Michael H. Purser, Plymouth; Jonathan M. Isherwood, Leamington Spa; Robert W. Tansley, Stratford-upon-Avon, all of England

[73] Assignee: Driver Southall Limited, England

[21] Appl. No.: 162,009

[22] Filed: Feb. 29, 1988

[30] Foreign Application Priority Data

Mar. 9, 1987 [GB] United Kingdom ............... 8705451

[51] Int. Cl.$^4$ ............... G01G 13/16; G01G 13/34; B67D 3/00; B67D 47/00
[52] U.S. Cl. ............... 177/25.18; 177/108; 177/112; 222/504; 222/556
[58] Field of Search ............... 177/25.18; 222/504, 222/505, 556

[56] References Cited

U.S. PATENT DOCUMENTS 4,522,321 6/1985 Kinoshita ............... 177/25.18 X
4,705,125 11/1987 Yamada et al. ............... 177/25.18

Primary Examiner—George H. Miller, Jr.
Attorney, Agent, or Firm—Kirschstein, Kirschstein, Ottinger & Israel

[57] ABSTRACT

A weighing hopper (20) comprising: a body portion for containing articles; a port in the body portion; a door (21) pivotally connected to the body portion for rotation about a first axis (A) between a first position in which the port is closed by the door (21) to retain articles in the body portion and a second position in which articles contained in the hopper (20) can be discharged through the port; and a mechanism (23) for moving the door (21) between its first and second positions comprising a first member (58) rigidly connected to the door (21); a second member (60) pivotally connected to the first member (58) for rotation about a second axis (E) parallel to and spaced from the first axis (A); and a third member (62) pivotally connected to the second member (60) for rotation about a third axis (B) parallel to and spaced from the second axis (E), and pivotally connected to the body portion for rotation about a fourth axis (C) parallel to and fixedly spaced from the first axis (A) so that rotation of the third member (62) about the fourth axis causes rotation of the door (21) about the first axis (A); and a first stop member (D) which defines the first closed position of the door (21) as a position just after the third axis (B) has moved through a straight line joining the second (E) and fourth (C) axes.

17 Claims, 4 Drawing Sheets

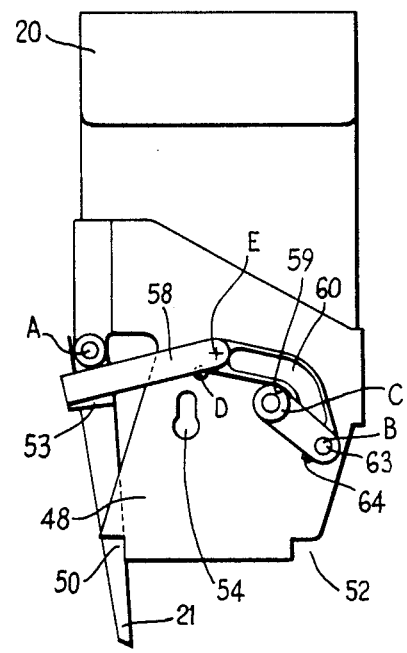

WEIGHING HOPPERS

This invention relates to weighing hoppers.

More particularly the invention relates to weighing hoppers suitable for use in combinational weighing systems of the kind, hereinafter referred to as the kind specified, comprising: a plurality of weighing machines each comprising a weighing hopper and an associated hopper module arranged to provide a measurement of the weight of the contents of the associated hopper; means for feeding articles into said hoppers; means for utilizing the weight measurements provided by said hopper modules to select from said hoppers a number of hoppers whose contents have a total weight substantially equal to a target weight; and means for discharging said selected number of hoppers to provide a batch of articles of substantially said target weight.

A weighing hopper for use in a combinational weighing system of the kind specified essentially comprises: a body portion for containing articles; a port in the body portion; a door pivotally connected to the body portion for rotation about a first axis between a first position in which said port is closed by the door to retain articles in the body portion and a second position in which articles contained in the hopper can be discharged through the port; and a mechanism for moving said door between its first and second positions.

It is an object of the present invention to provide a weighing hopper suitable for use in a combinational weighing system of the kind specified wherein the possibility of the door opening under the weight of articles in the hopper is prevented.

According to the present invention a weighing hopper suitable for use in a combinational weighing system of the kind specified comprises: a body portion for containing articles; a port in the body portion; a door pivotally connected to the body portion for rotation about a first axis between a first position in which said port is closed by the door to retain articles in the body portion and a second position in which articles contained in the hopper can be discharged through the port; and a mechanism for moving said door between its first and second positions comprising a first member rigidly connected to said door; a second member pivotally connected to said first member for rotation about a second axis parallel to and spaced from said first axis; and a third member pivotally connected to said second member for rotation about a third axis parallel to and spaced from said second axis, and pivotally connected to said body portion for rotation about a fourth axis parallel to and fixedly spaced from said first axis so that rotation of the third member about said fourth axis causes rotation of said door about said first axis; and a first stop member which defines said first closed position of the door as a position just after said third axis has moved through a straight line joining said second and fourth axes.

In a preferred embodiment of the invention the hopper further includes a second stop member which defines the said second open position of said door, the first and second stop members are positioned so that rotation of said third member about said fourth axis as said door moves between said first open and second closed positions is through an angle of substantially 180°, and the relative dimensions of the members of said mechanisms are such that, when said third member rotates about said fourth axis with a substantially constant angular velocity, said door rotates about said fourth axis with a relatively low angular velocity in the region of the open and closed positions and a relatively high angular velocity at an intermediate region between said open and closed positions.

One weighing hopper in accordance with the present invention will now be described, by way of example, with reference to the accompanying drawings in which:

FIG. 6 is a first elevation of the weighing hopper of FIG. 4 in a second condition.

Figure 1:
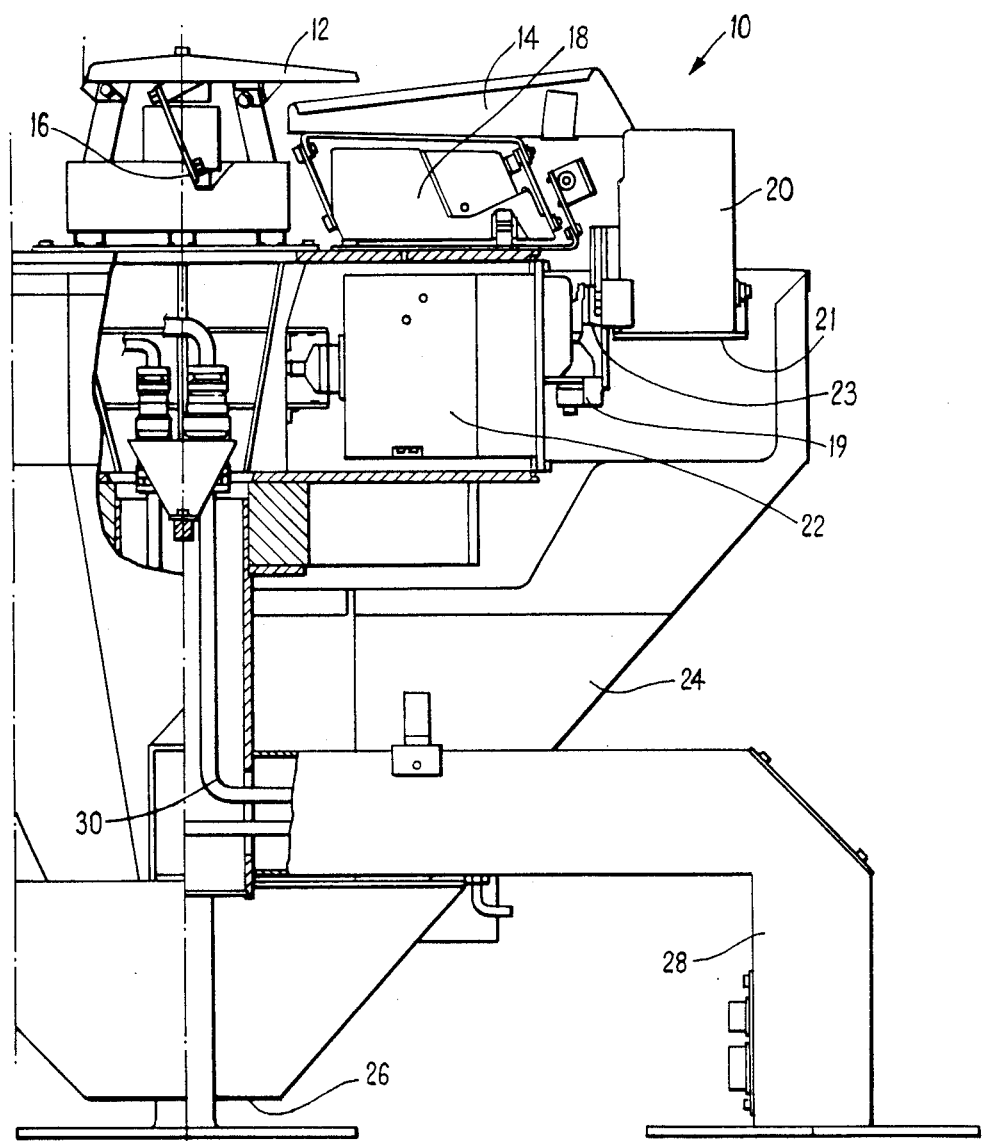
FIG. 1 is a part-sectioned elevation of a portion of a weigher of a combinational weighing system.

Referring to FIG. 1, the weigher 10 has a centrally positioned circular table 12 which is caused to undergo vibratory motion by a vibrator 16 beneath the table 12 such that articles (not shown) on the table move radially towards the edge of the table 12. Extending radially outward from beneath the table 12 there are twenty-eight feeders 14, each in the form of a channel, the top of one side of each channel being folded over the top of the other side of the adjacent channel. Each feeder 14 is caused to undergo independent vibratory motion by a respective vibrator 18 disposed beneath the feeder 14. Hence, articles on reaching the edge of the table 12 fall onto the feeders 14 and are vibrated there along until reaching the outer ends of the feeders. Disposed beneath the outer end of each feeder 14 is a respective weighing hopper 20, the hoppers 20 therefore lying in a circle around the feeders 14. Upon reaching the outer ends of the feeders 14 the articles fall into the respective hoppers 20 and are stored thereby. At the bottom of each hopper 20 there is a hinged door 21 which may be opened and closed by means of a mechanism 23 operated by a hopper module 22, there being one module 22 for each hopper 20 and the twenty-eight modules 22 lying in a circle beneath the vibrators 18. Each module 22 further includes means for weighing the contents of the associated hopper 20, each hopper 20 being supported on its associated module 22 by a coupling 19. Weight signals representative of the weight of the contents of the hoppers 20 as measured by the respective modules 22 pass along a cable 30 and out of the weigher 10 via a duct 28 to a central control (not shown) of the system. The weigher 10 and the central control together comprise the combinational weighing system. Operation of a mechanism 23 to open a hopper door 21 results in the contents of the hopper 20 falling into a common conical collecting chute 24 and hence out of the weigher 10 via an aperture 26 at the bottom of the chute 24.

The basic function of the combinational weighing system is to feed successive batches of articles of substantially a target weight set by the operator into a series of containers placed in turn to receive articles via the aperture 26 at the bottom of the chute 24. To this end articles are fed onto the table 12 and hence fed to the hoppers 20 due to the vibrating motion of the table 12 and the feeders 14. When the contents of each of the hoppers 20 is substantially of an 'aim' weight 'asked' of it by the central control the supply of articles is stopped and the weight of the contents of each hopper is accurately measured by the central control. Using these accurate weight measurements, a selection is made by the central control of the hoppers, typically four, the total weight of whose contents differs by not more than a preset amount from the target weight. The contents of the selected hoppers is then discharged into a container, and the process repeated for filling of a further container. It will be noted that after a cycle of the operation of the system, in the next cycle generally only the selected discharged hoppers are fed with articles. This is effected by operation only of the radial feeders 14 corresponding to the selected hoppers.

Figure 2:
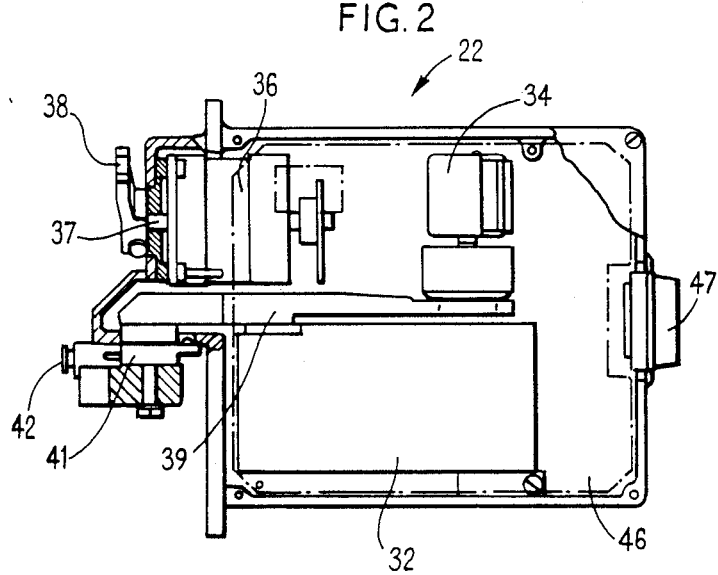
FIG. 2 is a part-sectioned side view of one of a plurality of hopper modules of the weigher.
Figure 3:
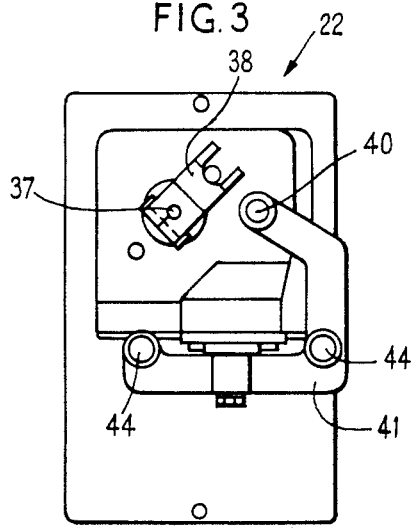
FIG. 3 is an end view of the hopper module of FIG. 2.

Referring now to FIG. 2 and FIG. 3, each module 22 includes a load cell 32, a calibration mechanism 34, a stepper motor 36 which drives via the rotor 37 of the motor a dog clutch 38, a weigh cell bracket 39, and a support member 41 having three projections 40, 42 and 44. Each module 22 further includes a circuit board 46, on which is located an electronic circuit for the module 22, and a connection 47 whereby information from the module 22 may pass to the cable 30 and vice versa.

Figure 4:
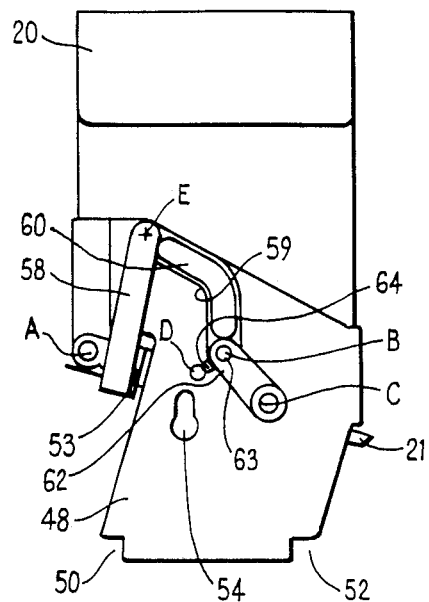
FIG. 4 is a firs elevation of one of a plurality of weighing hoppers of the weigher in a first condition.
Figure 5:
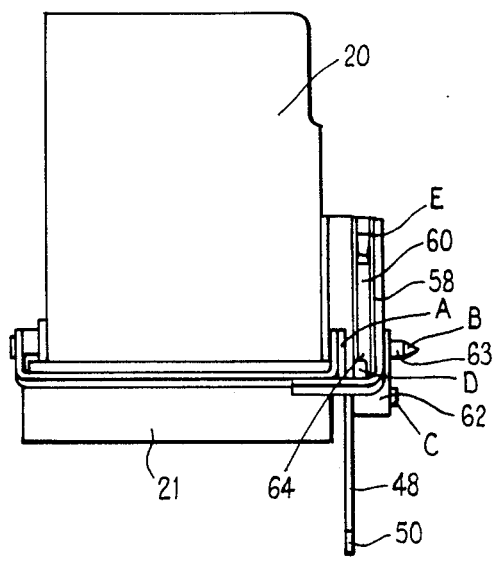
FIG. 5 is a second elevation of the weighing hopper of FIG. 4 in the first conditions.

Referring to FIGS. 4, 5 and 6, fixed to the inner side of each hopper 20 there is a metal plate 48 having at its lower two corners shoulder grooves 50, 52 and extending through its mid-portion an aperture 54. Rigidly fixed to a point 53 on the hopper door 21 adjacent the door hinge axis A is one end of a first member 58, the other end of the first member 58 being pivotally connected on an axis E to one end of a second or dog-leg member 60. The other end of the dog-leg member 60 is pivotally connected on an axis B to one end of a third member 62, the other end of the third member 62 being pivotally connected on an axis C to a mid-portion of the plate 48 near the aperture 54. A projection 64 at the end of the dog-leg member 60 pivotally connected on axis B, abuts against a stop D on the plate 48 when the door 21 closes. Extending axially from the third member 62 on the axis B there is a drive projection 63. The projection 63, the third member 62, the dog-leg member 60 including projection 64, the first member 58, the fixing at the point 53 and the stop D together constitute the aforementioned mechanism 23. The metal plate 48 including grooves 50, 52 and aperture 54 constitute part of the aforementioned coupling 19.

Referring now to FIGS. 2, 3, 4, 5 and 6, in use of the weigher 10 each hopper 20 is supported on a respective module 22 by placing the projections 40, 42 and 44 into the receiving aperture 54 and the shoulder grooves 50 and 52 respectively of the hopper 20. The hopper 20 is then slid downwards to secure it to its respective module 22. The weight of the hopper 20, the contents of the hopper 20, the mechanism 23 and the metal plate 48 will therefore act on the three projections 40, 42 and 44, this weight being transmitted via the support member 41 and the weigh cell bracket 39 to the load cell 32 where it is measured. Processing of this measured weight takes place in the electronic circuit of the module 22 on the circuit board 46. The weight signal measured by the load cell 32 is subsequently transmitted to the central control of the system via the cable 30 in FIG. 1. When a module 22 is connected to a respective hopper 20 as afore described, the dog clutch 38 is positioned so as to engage the drive projection 63 on the hopper. The stepper motor 36 can thus rotate the dog clutch 38 and hence the projection 63 about the axis C under the control of the electronic circuitry on the board 46 and the central control of the system. With reference to FIG. 4, rotation of the projection 63 in the anti-clockwise direction results in the first member 58, dog-leg member 60 and third member 62 attaining the position, shown in FIG. 4, where the hopper door 21 is closed and the projection 64 of the dog-leg member 60 abuts against the stop D to prevent further rotation of the pivot B in the anti-clockwise direction. It would be noted that in this position the projection 63 and hence axis B is beneath a straight line drawn between the axis E and the axis C. Hence the axis B has moved into an over-centre position and consequently the hopper door 21 cannot be opened by downward pressure on the door since such downward pressure merely causes the projection 64 to press harder against the stop D. Rotation of the projection 63 in the clockwise direction causes the projection 63 to rotate clockwise about the axis C until the inner edge 59 of the dog-leg member 60 abuts against the pivotal connection between the third member 62 and the metal plate 48 as shown in FIG. 6. Such abutment prevents further rotation of the projection 63 in the clockwise direction and defines the open position the hopper door 21. It will be noted that the rotation of the third member 62 about the axis C as the door 21 moves between its open and closed positions is through an angle of substantially 180°. It will also be noted that the relative dimensions of the first member 58, dog-leg member 60 and third member 62 are such that, when the stepper motor 36 rotates the third member 62 about the axis C with a substantially constant angular velocity, the door 21 rotates about the hinge axis A with a relatively low angular velocity in the region of the open and closed positions and a relatively high angular velocity at an intermediate region between the open and closed positions. This is because the movement of the projection 63 when the door 21 is in the region of the open and closed positions is in a direction substantially perpendicular to the line of resultant movement of the axis E, when the door 21 is in the intermediate region between the open and closed positions, the movement of the projection 63 is in a direction substantially parallel to the line of resultant movement of the axis E. It is advantageous that the door 21 normally moves relatively slowly when in the region of the open and closed positions since this substantially prevents the door 'clanging' open and shut and imparting unwanted vibrations to the weigher 10. It is also advantageous that the door 21 moves relatively quickly when at an intermediate region between the open and closed positions since a minimum delay then occurs in 'dumping' the articles in the hopper 20 when this is required. Furthermore, it is convenient that the above non-linear door is produced by constant angular velocity rotation of the third member 62. When the hopper door 21 is in the position shown in FIG. 4, i.e. is closed so that articles may be fed into the hopper 20 for weighing, the dog clutch 38 is positioned by the stepper motor 36 so as not to contact the projection 63. This avoids interference of the dog clutch 38 with the weighing of the hopper 20.

It will be appreciated that, since the operation of the stepper motor 36 is under the control of the electronic circuitry on the board 46 and the central control of the system, the stepper motor is effectively under so control and thereby the characteristics of the rotation of the third member 62 about the axis C and hence the characteristics of the opening and closing of the hopper door 21 can be easily altered. Thus, if it is desired that the hopper door 21 'slams' open or shut, in order perhaps to dislodge hopper contents which have adhered to the walls of the hopper, this can be achieved.

We claim:

1. A weighing hopper comprising: a body portion for containing articles; a port in the body portion; a door pivotally connected to the body portion for rotation about a first axis between a first position in which said port is closed by the door to retain articles in the body portion and a second position in which articles contained in the hopper can be discharged through the port; and a mechanism for moving said door between its first and second positions comprising a first member rigidly connected to said door; a second member pivotally connected to said first member for rotation about a second axis parallel to and spaced from said first axis; and a third member pivotally connected to said second member for rotation about a third axis parallel to and spaced from said second axis, and pivotally connected to said body portion for rotation about a fourth axis parallel to and fixedly spaced from said first axis so that rotation of the third member about said fourth axis causes rotation of said door about said first axis; and a first stop member which defines said first closed position of the door as a position just after said third axis has moved through a straight line joining said second and fourth axes.

2. A weighing hopper according to claim 1 wherein said first stop member defines said first closed position by abutment with one of said members of said mechanism.

3. A weighing hopper according to claim 2 wherein said one of said members of said mechanism is said second member.

4. A weighing hopper according to claim 1 wherein said mechanism further includes a second stop member which defines said second open position of said door.

5. A weighing hopper according to claim 4 wherein said second stop member defines said second position of the door by abutment with said second member of said mechanism.

6. A weighing hopper according to claim 5 wherein said second member is cranked about the point at which it abuts with said second stop member.

7. A weighing hopper according to claim 4 wherein said second stop member is located in the region of said fourth axis.

8. A weighing hopper according to claim 7 wherein said second stop member comprises an end of said third member, at which end said third member is pivotally connected to said body portion for rotation about said fourth axis.

9. A weighing hopper according to claim 4 wherein said first and second stop members are positioned so that the rotation of said third member about said fourth axis as said door moves between said first open and said second closed positions is through an angle of substantially 180°.

10. A weighing hopper according to claim 9 wherein the relative dimensions of the members of said mechanism are such that, when said third member rotates about said fourth axis with a substantially constant angular velocity, said door rotates about said fourth axis with a relatively low angular velocity in the region of the open and closed positions and a relatively high angular velocity at an intermediate region between said open and closed positions.

11. A weighing hopper according to claim 1 in combination with prime mover means for operating said mechanism, said prime mover means acting on said third member.

12. A weighing hopper according to claim 11 wherein said prime mover means is an electric stepper motor.

13. A weighing hopper according to claim 12 wherein the system further includes software control means for controlling said electric stepper motor for varying the characteristics of the rotation of said third member about said fourth axis and hence varying the characteristics of the opening and closing of said door.

14. A weighing hopper according to claim 12 wherein said stepper motor causes the rotation of said third member about said fourth axis by means of the rotation of a dog-clutch rigidly fixed at one end to the rotor of the stepper motor and positioned so as to engage at the other end said third member.

15. A weighing hopper according to claim 14 wherein said other end engages said third member by means of a projection from said third member in the region of said third axis.

16. A combinational weighing system comprising: a plurality of weighing machines each comprising a weighing hopper and an associated hopper module arranged to provide a measurement of the weight of the contents of the associated hopper; means for feeding articles into said hoppers; means for utilizing the weight measurements provided by said hopper modules to select from said hoppers a number of hoppers whose contents have a total weight substantially equal to a target weight; and means for discharging said selected number of hoppers to provide a batch of articles of substantially said target weight, wherein each said weighing hopper comprises: a body portion for containing articles; a port in the body portion; a door pivotally connected to the body portion for rotation about a first axis between a first position in which said port is closed by the door to retain articles in the body portion and a second position in which articles contained in the hopper can be discharged through the port; and a mechanism for moving said door between its first and second positions comprising a first member rigidly connected to said door; a second member pivotally connected to said first member for rotation about a second axis parallel to and spaced from said first axis; and a third member pivotally connected to said second member for rotation about a third axis parallel to and spaced from said second axis, and pivotally connected to said body portion for rotation about a fourth axis parallel to and fixedly spaced from said first axis so that rotation of the third member about said fourth axis causes rotation of said door about said first axis; and a first stop member which defines said first closed position of the door as a position just after said third axis has moved through a straight line joining said second and fourth axes.

17. A combinational weighing system according to claim 16 wherein each said weighing hopper is associated with a respective prime mover means for operating its said mechanism.

* * * * *